US012233881B2

(12) United States Patent
Ferrer et al.

(10) Patent No.: US 12,233,881 B2
(45) Date of Patent: Feb. 25, 2025

(54) METHODS AND SYSTEMS FOR VEHICLE OPERATION BASED ON THE DETERMINED DRIVER CATEGORY

(71) Applicant: Ford Global Technologies, LLC, Dearborn, MI (US)

(72) Inventors: Daniel Gimeno Ferrer, Valencia (ES); Xose Guimil Rey, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 17/666,074

(22) Filed: Feb. 7, 2022

(65) Prior Publication Data

US 2023/0249694 A1    Aug. 10, 2023

(51) Int. Cl.
*B60W 40/09*   (2012.01)
*B60W 50/08*   (2020.01)

(52) U.S. Cl.
CPC .......... *B60W 40/09* (2013.01); *B60W 50/08* (2013.01); *B60W 2540/30* (2013.01); *B60W 2556/45* (2020.02)

(58) Field of Classification Search
CPC .. B60W 40/09; B60W 50/08; B60W 2556/45; B60W 2540/30
See application file for complete search history.

(56) References Cited

U.S. PATENT DOCUMENTS

| 5,123,301 A * | 6/1992 | Hagele ................ F16H 61/0213 477/121 |
| 7,540,344 B2 * | 6/2009 | Yamamoto ............ B60W 50/08 180/65.285 |
| 8,480,125 B1 | 7/2013 | Belwafa et al. |
| 8,600,614 B2 * | 12/2013 | Filev ..................... B60W 50/00 701/65 |
| 9,333,975 B2 * | 5/2016 | Szwabowski ......... B60W 50/00 |
| 11,120,353 B2 | 9/2021 | Olabiyi et al. |
| 11,281,211 B2 * | 3/2022 | Kawamoto .............. G08G 1/00 |
| 2006/0048982 A1 * | 3/2006 | Yamamoto ............ B60W 10/06 180/65.225 |
| 2011/0079990 A1 | 4/2011 | Cheal et al. |
| 2012/0136506 A1 * | 5/2012 | Takeuchi ............ B60T 8/17555 701/1 |

(Continued)

FOREIGN PATENT DOCUMENTS

JP    2003182502 A    7/2003

OTHER PUBLICATIONS

Kim et al., "Development of a driver-oriented engine control unit (ecu)-mapping system with bigdata analysis," Journal of the Korean Society of Embedded Engineering, vol. 12, No. 4, pp. 247-258 (2017).

(Continued)

*Primary Examiner* — Ramsey Refai
(74) *Attorney, Agent, or Firm* — Haley Guiliano LLP

(57) ABSTRACT

Systems and methods are provided herein to improve operation of a vehicle and a vehicle comprising said systems, for example, by receiving one or more driver control signals from an electronic control unit (ECU) of the vehicle, calculating one or more time variability factors for each of the vehicle control signals, determining one or more driver categories based on the calculated time variability factors, and outputting a vehicle control signal based on the determined driver category.

20 Claims, 4 Drawing Sheets

(56) References Cited

U.S. PATENT DOCUMENTS

| | | | |
|---|---|---|---|
| 2013/0041534 A1* | 2/2013 | Kim | B60W 20/10 |
| | | | 903/902 |
| 2014/0257662 A1* | 9/2014 | Takeuchi | B60W 30/182 |
| | | | 701/70 |
| 2016/0059816 A1 | 3/2016 | Je | |
| 2017/0206717 A1 | 7/2017 | Kühnapfel | |
| 2018/0259956 A1* | 9/2018 | Kawamoto | B60W 50/0098 |
| 2019/0031187 A1* | 1/2019 | Noguerol | B60W 40/08 |
| 2021/0223391 A1 | 7/2021 | Drysch et al. | |
| 2021/0311726 A1 | 10/2021 | Fox | |
| 2022/0194401 A1* | 6/2022 | Gee | B60W 50/10 |

OTHER PUBLICATIONS

Lee et al., "Automotive ecu data-based driver's propensity learning using evolutionary random forest," IEEE Access (2019).

\* cited by examiner

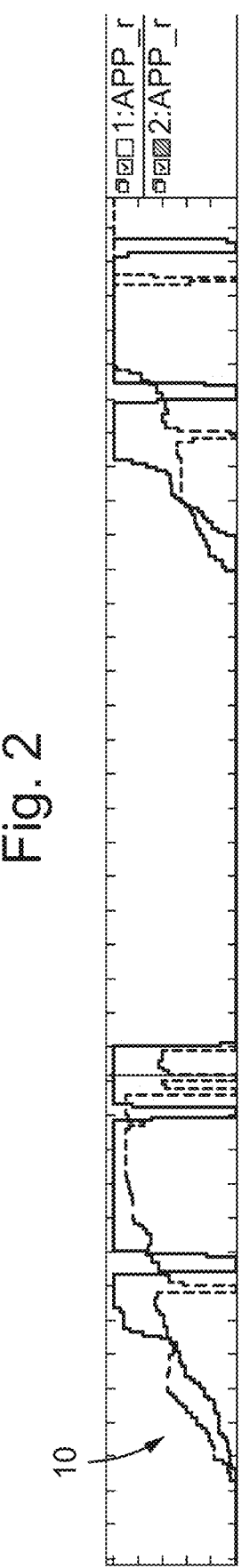
Fig. 2
Fig. 3

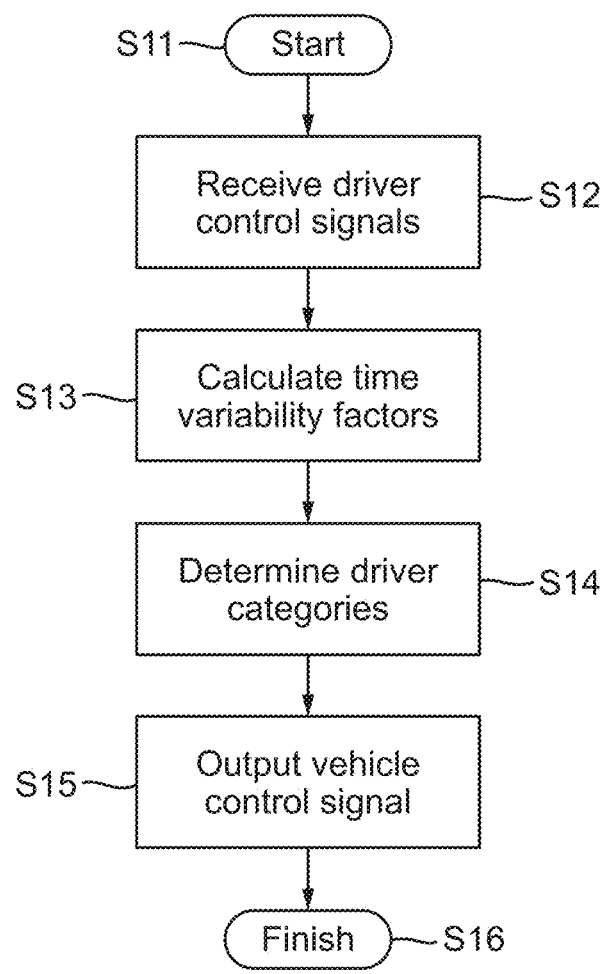

METHODS AND SYSTEMS FOR VEHICLE OPERATION BASED ON THE DETERMINED DRIVER CATEGORY

BACKGROUND

The present disclosure relates to methods and systems to operate vehicles, and vehicles comprising said systems. More particularly, but not exclusively, the present disclosure relates to providing a vehicle control signal based on a determined driver category, where one or more driver categories are determined using signals from the electronic control unit (ECU).

SUMMARY

Various aspects of a vehicle's operation can be optimized or improved when information is known about the driver, such as their style of driving. For example, many vehicles include preset vehicle driving modes, such as a sport mode and/or eco mode. However, such preset driving modes are not always suited to the driving style of a driver. For example, an eco mode may be less efficient if the driver does not drive in a corresponding eco-friendly manner. If a driver has a sporty driving style, and the vehicle is driven beyond the expected parameters of the eco driving mode, the expected operating efficiency may be reduced.

In another example, a driver with very little experience may choose to drive a high performance vehicle or a vehicle with a high performance sport mode, e.g., where the pedal mapping, steering etc. are extremely responsive in comparison with a normal vehicle or normal driving mode. Such a driver may not have sufficient experience to drive such a vehicle in the desired manner.

It would be beneficial to control the operation of a vehicle based on information about the driver and/or their style of driving. As such, is it beneficial to characterize and categorize drivers e.g. according to their driving style.

Current ways of characterizing drivers usually involve ad-hoc sensors specific to the task of monitoring the driver e.g. cameras, temperature sensors, etc. Such sensors ad expense and complexity to a vehicle that implements such functionality.

Systems and methods are provided herein to improve control of vehicles by, for example, providing a vehicle control system based on a determined driver category. Vehicles comprising said systems may also be provided.

According to some aspects of the present invention, systems and methods are provided that receive one or more driver control signals from an electronic control unit (ECU) of the vehicle, calculate one or more time variability factors for each of the vehicle control signals, determine one or more driver categories based on the calculated time variability factors, and output a vehicle control signal based on the determined driver category. For example, a vehicle control signal may activate, deactivate, lock or unlock a driving mode of the vehicle, output a navigation route for the vehicle, and/or adjust a preset time and/or mileage for display of a maintenance indicator.

In some examples, the time variability factors include any of: number of changes of signal direction, number of signal changes above a threshold, and/or average extent of signal changes.

In some examples, the threshold for counting number of signal changes is a threshold extent of change or a threshold rate of change.

In some examples, the signal processing module is configured to calculated the average extent of signal changes by measuring a period, e.g., each period, where a rate of signal change is above a threshold, calculating a difference in signal value over the time taken, and averaging over multiple measured periods.

In some examples, the driver control signals include any of: acceleration, braking, steering wheel and/or gear changes.

In some examples, the time variability factors include a number of changes between acceleration and braking.

In some examples, the signal processing module is configured to calculate the time variability factors for signals collected over a predefined time period.

In some examples, the driver categories include one or more of: experienced, inexperienced, eco or sport.

In some examples, the categorization module is configured to determine one or more driver characteristics based on one or more time variability factors, and determine the driver category based on the determined driver characteristic(s).

In some examples, the one or more driver characteristics include one or more of: intentionality, doubt, sporty, eco, predictable, unpredictable, easy or difficult.

In some examples, the categorization module is configured to determine a plurality of potential categories based on each driver control signal, and set the driver categories according to the most common potential categories.

In some examples, the vehicle control signal includes one or more of a vehicle mode signal to activate, deactivate, lock or unlock at least one driving mode of the vehicle, a navigation signal to output a navigation route for the vehicle, and/or a maintenance signal to adjust a preset time and/or mileage for display of a maintenance indicator.

In some examples, the categorization module is arranged in a server remote from and wirelessly connected with the remaining modules.

According to one aspect of the present invention, a vehicle control system is provided. The vehicle control system comprises an input module configured to receive one or more driver control signals from an electronic control unit, ECU, of the vehicle; a signal processing module configured to calculate one or more time variability factors for each of the vehicle control signals; a categorization module configured to determine one or more driver categories based on the calculated time variability factors; and a control module configured to output a vehicle control signal based on the determined driver category.

According to one aspect of the present invention, a vehicle comprising the vehicle control system is provided.

According to one aspect of the present invention, a computer-readable medium is provided. The computer-readable may include instructions which, when executed by a processor, cause the processor to perform: receiving, by an input module, one or more driver control signals from an electronic control unit, ECU, of the vehicle, calculating, by a signal processing module, one or more time variability factors for each of the vehicle control signals, determining, by a categorization module, one or more driver categories based on the calculated time variability factors; and outputting, by a control module, a vehicle control signal based on the determined driver category.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which:

FIG. 2 illustrates an exemplary chart showing received driver control signals.

FIG. 3 illustrates an exemplary chart showing received driver control signals.

FIG. 5 illustrates an example flowchart of a method of operating a vehicle, in accordance with some examples of the disclosure.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
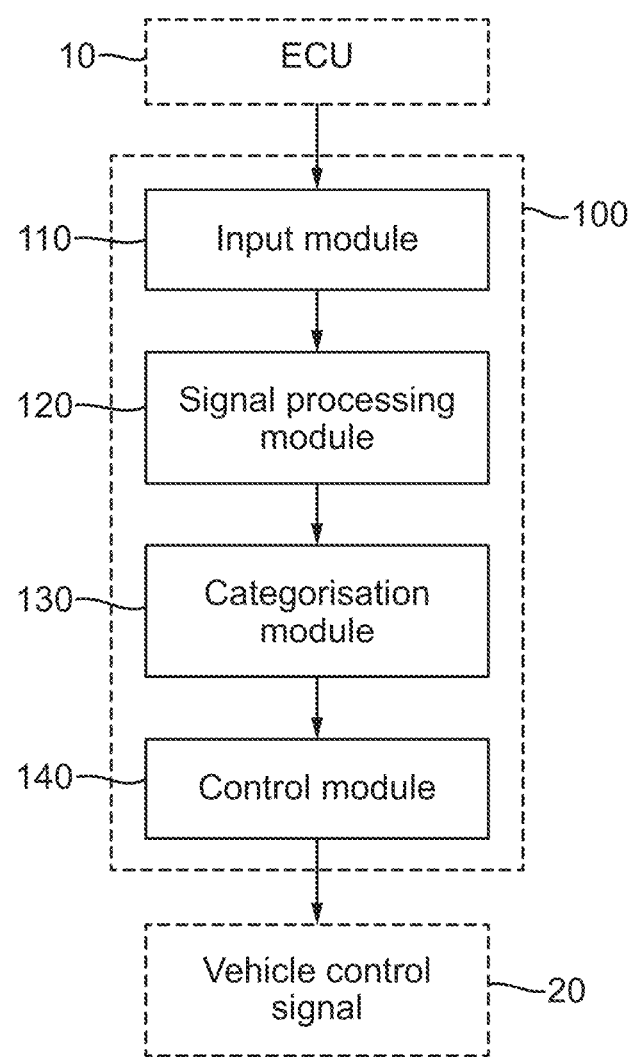
FIG. 1 illustrates an exemplary block diagram of a vehicle control system, in accordance with some examples of the disclosure.

FIG. 1 shows a block diagram of a vehicle control system 100, in accordance with some examples of the disclosure. The vehicle control system 100 comprises an input module 110, a signal processing module 120, a categorization module 130 and a control module 140.

The input module 110 is configured to receive one or more driver control signals 10 from an electronic control unit, ECU, of the vehicle. In some examples, the driver control signals 10 may include any of: acceleration, braking, steering wheel or gear changes. The ECU is configured to receive the driver control signals 10 from the driver via one or more input means e.g. pedals, steering wheel, gearstick etc. The ECU provides the driver control signal 10 to the appropriate output in the vehicle, e.g., the engine, steering, gearbox etc.

FIG. 2 shows a graph of received driver control signals 10 for two drivers A (solid line) and B (dashed line). More particularly, the graph shows a driver control signal 10 for acceleration for each driver. The driver control signals 10 for both drivers were recorded while driving a first route.

The signal processing module 120 is configured to calculate one or more time variability factors for each of the vehicle control signals 20. The time variability factors are calculated to indicate how much or how rapidly each vehicle control signal 20 changes over time.

In some examples, the time variability factors may include a number of changes of signal direction. For example, if a steering direction changes from left to right or vice versa, or if a driver stops increasing a level of braking and starts to decrease the level of braking. In some examples, the time variability factors may include a number of changes between two signals. For example, if a driver changes from acceleration to braking.

In some examples, the time variability factors may include a number of signal changes above a threshold. For example, if a driver increases from low level of acceleration to a high level of acceleration in a number of small steps. In some examples, the threshold for the counting number of signal changes may be a threshold extent of change, e.g., in the example above, if the driver increased the level of acceleration by a certain amount before pausing. Alternatively, the threshold for the counting number of signal changes may be a threshold rate of change.

In some examples, the time variability factors may include an average extent of signal changes. In some examples, the signal processing module 120 may be configured to calculate an average extent of signal changes by measuring each period where a rate of signal change is above a threshold, calculating a difference in signal value over the time taken, and averaging over all measured periods.

In the examples shown in FIG. 2, it can be seen that driver A has a greater average extent of changes in comparison with driver B. It can also be seen that driver A has fewer signal changes in the same direction in comparison with driver B.

FIG. 3 also shows received driver control signals 10 for two drivers C (dashed line) and D (solid line). Similarly, a graph shows a driver control signal 10 for acceleration for each driver. The driver control signals 10 for both drivers were recorded while driving a second route.

In the examples shown in FIG. 3, it can be seen that driver D has a greater number of changes in the same direction in comparison with driver C. It can also be seen that the average extent of changes for driver D is smaller than for driver C.

In some examples, the signal processing module 120 may be configured to calculate the time variability factors for driver control signals 10 collected over a predefined time period. For example, the driver control signals 10 may be collected over the course of a single journey, or a full day or any other period of time, e.g. a week. Alternatively, in some examples, a current time variability may be calculated e.g. based on signals collected over the preceding 1 to 5 minutes or less.

Each time variability factor may indicate certain characteristics of the drivers personality or driving style. For example, a greater number of changes may indicate doubt or hesitancy in the driver's style. More changes of a larger extent may indicate that the driver is more confident and/or has a more sporty style of driving.

The categorization module 130 is configured to determine one or more driver categories based on the calculated time variability factors. In some examples, the categorization module 130 may be configured to first determine one or more driver characteristics based on the time variability factors, and determine the driver category based on the determined driver characteristics.

In some examples, the driver characteristics may include one or more of: intentionality, doubt, sporty, eco, experienced, inexperienced, easy or difficult. For example, intentionality may be indicated by a greater extent of signal changes. A smaller extent of changes may indicate doubt, for example, when combined with frequent signal changes. A sporty demand may be indicated by, for example, a greater extent of signal changes. An eco demand may be indicated by, for example, a smaller number and extent of changes in the acceleration signal specifically. An experienced driver may be indicated by, for example, a small number of changes in the same direction. An inexperienced driver may be indicated by, for example, frequent and small changes in acceleration and steering signals, and/or a large extent of changes in the braking signal. Certain driver control signals 10 may indicate desired vehicle behavior that is easy to achieve, for example, infrequent braking signals with a greater extent. Other driver control signals 10 may indicate desired vehicle behavior that is difficult to achieve, for example, frequent braking signals with a greater extent.

In the example of FIG. 2, driver A has a greater average extent of changes and fewer signal changes in the same direction. The categorization module 130 may determine that the driver characteristics include, for example, one or more of intentionality, sporty, and experienced.

In the example of FIG. 3, driver D has a greater number of changes in the same direction and the average extent of changes is smaller. The categorization module 130 may determine that the driver characteristics include, for example, doubt and/or inexperienced.

The categorization module 130 may be configured to determine the driver category based on the determined driver characteristics. In some examples, the driver categories may include one or more of: predictable, unpredictable, eco or sport.

In the example of FIG. 2, where driver A has driver characteristics including intentionality, sporty, and experienced, the categorization module 130 may determine that the driver category is, for example, sporty and/or predictable.

In the example of FIG. 3, where driver D has driver characteristics including doubt and/or inexperienced, the categorization module 130 may determine that the driver category is, for example, predictable.

In some examples, the categorization module 130 may be configured to determine a plurality of potential categories based on each driver control signal 10, and set the driver categories according to the most common potential categories. For example, the categorization module 130 may determine a potential category based on each of the acceleration, braking and steering signals, and set any driver categories that are common to two out of the three driver control signals 10.

The control module 140 is configured to output a vehicle control signal 20 based on the determined driver category.

In this way, the vehicle control system 100 can direct the vehicle to operate in a way which is more efficient and/or more satisfying for the driver, according to the determined driver category. In some examples, a level of autonomous driving may be changed in response to the determined driver category. For example, where the determined driver category (e.g., sporty and/or predictable) indicates that the driver has an experienced driving style, the vehicle control system 100 may cause one or more vehicle setting to be changed to reduce (or remove) a level of driver assist functionality, such as traction control, lane control, auto braking, etc. Conversely, where the determined driver category (e.g., unpredictable) indicates that the driver has an inexperienced driving style, the vehicle control system 100 may cause one or more vehicle setting to be changed to increase (or maximize) a level of driver assist functionality, such as traction control, lane control, auto braking, etc.

The vehicle control system 100 exploits information already available in the vehicle, i.e. from the ECU, and thus avoids the need for additional specific sensors to monitor and categorize drivers.

In some examples, the vehicle control signal 20 may include a vehicle mode signal to activate, deactivate, lock or unlock a driving mode of the vehicle. The driving mode may define various parameters of the vehicle including, for example, pedal mapping, torque mapping, automatic gear changes, steering response, suspension response, hybrid motor balancing etc. In some examples, the driving mode of the vehicle may be a sport mode, eco mode or any other vehicle mode. In a sport mode, the vehicle may have, for example, a more responsive pedal mapping, more responsive steering or more responsive suspension. In an eco mode, the vehicle may have, for example, a less responsive pedal mapping, a higher gear bias or an electric motor bias.

In the example of FIG. 2 the control module 140 may offer a sport mode to driver A and in the example of FIG. 3 the control module 140 may offer a smoother non-sport or eco driving mode to driver D. In some examples, the control module 140 may automatically activate or deactivate the driving mode, either without driver intervention or following a driver confirmation. Alternatively, in some examples, the control module 140 may lock or unlock the driving mode, where the driver is only able to activate or deactivate a driving mode which is unlocked.

In this way, the driving mode of the vehicle can be adapted to the driver and the driver's style, based on the determined driver category. The vehicle can be made to operate in the most effective or most efficient vehicle mode for the driver. For example, where an eco-demand driver may be provided with an eco mode to maximize the operating efficiency of the vehicle, a sporty-demand driver may find their operating efficiency is lower in the eco-mode due to repeatedly pushing the vehicle beyond the expected operational parameters. In addition, a vehicle can be made to operate in a more predictable manner, e.g. by deactivating or locking a sport mode for an inexperienced driver. In addition, a vehicle can be made to operate in a vehicle mode which is more satisfying for the driver, e.g. by activating or unlocking a sport mode for a sporty-demand driver.

In some examples, the vehicle control signal 20 may include a navigation signal to output a navigation route for the vehicle. In some examples, the navigation route may be determined by comparison of the time variability factors with those of other drivers driving a similar route, or by comparison with time variability factors calculated for the same driver in an earlier time period. For example, a driver may be provided with a navigation route for which the majority of other drivers have been determined to be in the eco category. Similarly, where a driver has previously driven a number of alternative routes between two waypoints, the navigation signal may output the navigation route for which the driver was determined to be in the eco category. In this way, the vehicle control system 100 can cause drivers to drive along more efficient navigation routes. Alternatively, in some examples, a driver may be provided with a navigation route based on the most results in the predictable category, causing the driver to drive along a certain route, e.g., a route with less traffic and/or less turns.

In some examples, the vehicle control signal 20 may include a maintenance signal to adjust a preset time or mileage for display of a maintenance indicator. For example, where a driver is determined to be in the sporty category, the maintenance signal may reduce the preset time or mileage for display of the maintenance indicator. In this way, a vehicle which is driven in a more aggressive style, with a greater degree of stress on the components, can be maintained more often to ensure that the vehicle operates with intended operational efficiency. Conversely, where a driver is determined to be in the eco category, the maintenance signal may increase the preset time or mileage for display of the maintenance indicator. In this way, a vehicle which is driven in a more economical style, with a lower degree of stress on the components, can be maintained less often to prevent wasteful replacement of parts in good condition.

Figure 4:
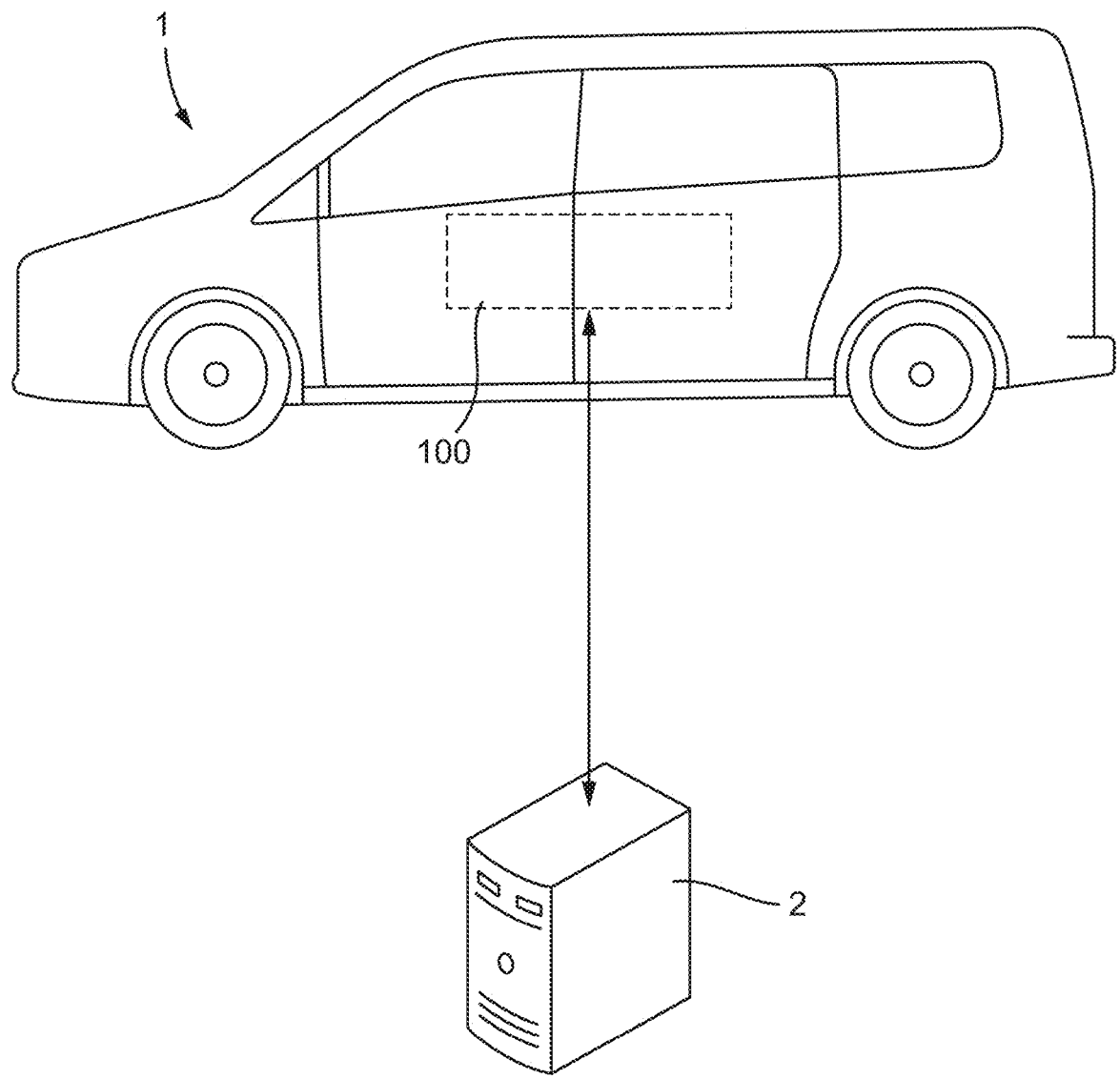
FIG. 4 illustrates an exemplary diagram of a vehicle comprising a vehicle control system, in accordance with some examples of the disclosure.

FIG. 4 shows a vehicle 1, in accordance with some examples of the disclosure. The vehicle comprises the vehicle control system 100 of the example shown in FIG. 1.

In some implementations, the categorization module 130 may be arranged in a server 2 remote from and wirelessly connected with the remaining modules. For example, the vehicle 1 may be connected with the server 2 through a wireless internet connection, e.g. mobile cellular data connection or satellite data connection. The signal processing module 120 may be configured to provide the time variability factors to the server via the wireless connection. The categorization module 130 arranged in the server 2 may be configured to determine the driver category and return the driver category to the control module 140 arranged in the vehicle 1 via the wireless connection.

Alternatively, or in addition, the control module 140 may be arranged in the server 2. For example, the control module 140 in the server may be configured to generate a vehicle control signal 20 and transmit the vehicle control signal 20 to the vehicle through the wireless connection. In some examples, the control module 140 arranged in the server 2 may receive the driver categories from a categorization module 130 arranged in the server 2, or may receive the driver categories from a categorization module 130 arranged in the vehicle 1.

Alternatively, in some implementations, the entire vehicle control device may be arranged in the server 2. For example, the driver control signals 10 may be provided from the vehicle ECU to the input module 110 arranged in the server via the wireless connection. In some examples, the driver control signals 10 may be streamed continuously, or may be transmitted in batches, e.g., after a predetermined period of time or after each journey.

Alternatively, in some implementations, the entire vehicle control device may be arranged in the vehicle 1.

FIG. 5 is a flowchart representing an illustrative process for operating a vehicle, in accordance with some examples of the disclosure.

The process starts at S11.

At S12, one or more driver control signals are received from an electronic control unit, ECU, of the vehicle. In some examples, the driver control signals may include any of: acceleration, braking, steering wheel or gear changes. The ECU is configured to receive the driver control signals from the driver via one or more input means e.g. pedals, steering wheel, gearstick etc. The ECU provides the driver control signal to the appropriate output in the vehicle e.g. the engine, steering, gearbox etc.

At S13, one or more time variability factors are calculated for each of the vehicle control signals. The time variability factors are calculated to indicate how much or how rapidly each vehicle control signal changes over time.

In some examples, the time variability factors may include a number of changes of signal direction. For example, if a steering direction changes from left to right or vice versa, or if a driver stops increasing a level of braking and starts to decrease the level of braking. In some examples, the time variability factors may include a number of changes between two signals. For example, if a driver changes from acceleration to braking.

In some examples, the time variability factors may include a number of signal changes above a threshold. For example, if a driver increases from low level of acceleration to a high level of acceleration in a number of small steps. In some examples, the threshold for the counting number of signal changes may be a threshold extent of change, i.e. in the example above, if the driver increased the level of acceleration by a certain amount before pausing. Alternatively, the threshold for the counting number of signal changes may be a threshold rate of change.

In some examples, the time variability factors may include an average extent of signal changes. In some examples, the signal processing module may be configured to calculated the average extent of signal changes by measuring each period where a rate of signal change is above a threshold, calculating a difference in signal value over the time taken, and averaging over all measured periods.

In some examples, the time variability factors may be calculated for driver control signals collected over a predefined time period. For example, the driver control signals may be collected over the course of a single journey, or a full day or any other period of time, e.g. a week. Alternatively, in some examples, a current time variability may be calculated e.g. based on signals collected over the preceding 1 to 5 minutes or less.

Each time variability factor may indicate certain characteristics of the drivers personality or driving style. For example, a greater number of changes may indicate doubt or hesitancy in the driver's style. More changes of a larger extent may indicate that the driver is more confident and/or has a more sporty style of driving.

At S14, one or more driver categories are determined based on the calculated time variability factors. In some examples, one or more driver characteristics may first be determined based on the time variability factors, and the driver category may be determined based on the determined driver characteristics.

In some examples, the driver characteristics may include one or more of: intentionality, doubt, sporty, eco, experienced, inexperienced, easy or difficult. For example, intentionality may be indicated by a greater extent of signal changes. A smaller extent of changes may indicate doubt, for example, when combined with frequent signal changes. A sporty demand may be indicated by, for example, a greater extent of signal changes. An eco demand may be indicated by, for example, a smaller number and extent of changes in the acceleration signal specifically. An experienced driver may be indicated by, for example, a small number of changes in the same direction. An inexperienced driver may be indicated by, for example, frequent and small changes in acceleration and steering signals, and/or a large extent of changes in the braking signal. Certain driver control signals may indicate desired vehicle behavior that is easy to achieve, for example, infrequent braking signals with a greater extent. Other driver control signals may indicate desired vehicle behavior that is difficult to achieve, for example, frequent braking signals with a greater extent.

The driver category may be determined based on the determined driver characteristics. In some examples, the driver categories may include one or more of: predictable, unpredictable, eco or sport.

In some examples, a plurality of potential categories may be determined based on each driver control signal, and the driver categories may be set according to the most common potential categories. For example, a potential category may be determined based on each of the acceleration, braking and steering signals, and any driver categories may be set that are common to two out of the three driver control signals.

At S15, a vehicle control signal is output based on the determined driver category.

In this way, the process can direct the vehicle to operate in a way which is more efficient and/or more satisfying for the driver, according to the determined driver category. The process exploits information already available in the vehicle, e.g., from the ECU, and thus avoids the need for additional specific sensors to monitor and categorize drivers.

In some examples, the vehicle control signal may include a vehicle mode signal to activate, deactivate, lock or unlock a driving mode of the vehicle. The driving mode may define various parameters of the vehicle including, for example, pedal mapping, torque mapping, automatic gear changes, steering response, suspension response, hybrid motor balancing, etc. In some examples, the driving mode of the vehicle may be a sport mode, eco mode or any other vehicle mode. In a sport mode, the vehicle may have, for example, a more responsive pedal mapping, more responsive steering or more responsive suspension. In an eco mode, the vehicle may have, for example, a less responsive pedal mapping, a higher gear bias or an electric motor bias.

In this way, the driving mode of the vehicle can be adapted to the driver and the driver's style, based on the determined driver category. The vehicle can be made to operate in the most effective or most efficient vehicle mode for the driver. For example, where an eco-demand driver may be provided with an eco mode to maximize the operating efficiency of the vehicle, a sporty-demand driver may find their operating efficiency is lower in the eco-mode due to repeatedly pushing the vehicle beyond the expected operational parameters. In addition, a vehicle can be made to operate in a more predictable manner, e.g. by deactivating or locking a sport mode for an inexperienced driver. In addition, a vehicle can be made to operate in a vehicle mode which is more satisfying for the driver, e.g. by activating or unlocking a sport mode for a sporty-demand driver.

In some examples, the vehicle control signal may include a navigation signal to output a navigation route for the vehicle. In some examples, the navigation route may be determined by comparison of the time variability factors with those of other drivers driving a similar route, or by comparison with time variability factors calculated for the same driver in an earlier time period. For example, a driver may be provided with a navigation route for which the majority of other drivers have been determined to be in the eco category. Similarly, where a driver has previously driven a number of alternative routes between two waypoints, the navigation signal may output the navigation route for which the driver was determined to be in the eco category. In this way, the process can cause drivers to drive along more efficient navigation routes. Alternatively, in some examples, a driver may be provided with a navigation route based on the most results in the predictable category, causing the driver to drive along a certain route.

In some examples, the vehicle control signal may include a maintenance signal to adjust a preset time or mileage for display of a maintenance indicator. For example, where a driver is determined to be in the sporty category, the maintenance signal may reduce the preset time or mileage for display of the maintenance indicator. In this way, a vehicle which is driven in a more aggressive style, with a greater degree of stress on the components, can be maintained more often to ensure that the vehicle operates with peak operational efficiency. Conversely, where a driver is determined to be in the eco category, the maintenance signal may increase the preset time or mileage for display of the maintenance indicator. In this way, a vehicle which is driven in a more economical style, with a lower degree of stress on the components, can be maintained less often to prevent wasteful replacement of parts in good condition.

This disclosure is made for the purpose of illustrating the general principles of the systems and processes discussed above and are intended to be illustrative rather than limiting.

More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A vehicle control system, comprising:
   an input module configured to receive one or more driver control signals from an electronic control unit (ECU) of the vehicle;
   a signal processing module configured to calculate one or more time variability factors for each of the vehicle control signals;
   a categorization module configured to determine one or more driver categories based on the calculated time variability factors; and
   a control module configured to output a vehicle control signal based on the determined driver category, wherein the vehicle control signal includes a navigation signal to output a navigation route for the vehicle and a maintenance signal to adjust a preset time or mileage for display of a maintenance indicator.

2. The vehicle control system of claim 1, wherein the time variability factors include any of: number of changes of signal direction, number of signal changes above a threshold, or average extent of signal changes.

3. The vehicle control system of claim 2, wherein the threshold for counting number of signal changes is a threshold extent of change or a threshold rate of change.

4. The vehicle control system of claim 2, wherein the signal processing module is configured to calculate the average extent of signal changes by measuring each period where a rate of signal change is above a threshold, calculating a difference in signal value over the time taken, and averaging over all measure periods.

5. The vehicle control system of claim 1, wherein the driver control signals include any of: acceleration, braking, steering wheel or gear changes.

6. The vehicle control system of claim 5, wherein the time variability factors include a number of changes between acceleration and braking.

7. The vehicle control system of claim 1, wherein the signal processing module is configured to calculate the time variability factors for driver control signals collected over a predefined time period.

8. The vehicle control system of claim 1, wherein the driver categories include one or more of: predicable, unpredictable, eco or sport.

9. The vehicle control system of claim 1, wherein the categorization module is configured to determine one or more driver characteristics based on the time variability factors, and determine the driver category based on the determined driver characteristics.

10. The vehicle control system of claim 9, wherein the driver characteristics include one or more of: intentionality, doubt, sporty, eco, experienced, inexperienced, easy or difficult.

11. The vehicle control system of claim 1, wherein the categorization module is configured to determine a plurality of potential categories based on each driver control signal, and set the driver categories according to the most common potential categories.

12. The vehicle control system of claim 1, wherein the vehicle control signal includes a vehicle mode signal to activate, deactivate, lock or unlock a driving mode of the vehicle.

13. The vehicle control system of claim 1, wherein the categorization module is arranged in a server remote from and wirelessly connected with the remaining modules.

14. A vehicle comprising the vehicle control system of claim 1.

15. A computer-implemented method of controlling a vehicle, comprising:
   receiving, by an input module, one or more driver control signals from an electronic control unit (ECU) of the vehicle;
   calculating, by a signal processing module, one or more time variability factors for each of the vehicle control signals;
   determining, by a categorization module, one or more driver categories based on the calculated time variability factors; and
   outputting, by a control module, a vehicle control signal based on the determined driver category, wherein the vehicle control signal includes a navigation signal to output a navigation route for the vehicle and a maintenance signal to adjust a preset time or mileage for display of a maintenance indicator.

16. The computer-implemented method of claim 1, wherein the time variability factors include any of number of changes of signal direction, number of signal changes above a threshold, or average extent of signal changes.

17. The computer-implemented method of claim 1, wherein the driver control signals indicate include any of acceleration, braking, steering wheel or gear changes.

18. The computer-implemented method of claim 1, wherein the determining comprising determining one or more driver characteristics based on the time variability factors, and determining the driver category based on the determined driver characteristics.

19. The computer-implemented method of claim 1, wherein the vehicle control signal includes a vehicle mode signal to activate, deactivate, lock or unlock a driving mode of the vehicle.

20. A computer-readable medium comprising instructions which, when executed by a processor, cause the processor to perform the method of claim 15.

* * * * *